United States Patent

Cabanaw

[11] Patent Number: 4,482,532
[45] Date of Patent: Nov. 13, 1984

[54] SYSTEM AND PROCESS FOR PRODUCING ELEMENTAL SULFUR

[75] Inventor: Boyd E. Cabanaw, Tulsa, Okla.

[73] Assignee: Standard Oil Company (Indiana), Chicago, Ill.

[21] Appl. No.: 518,718

[22] Filed: Jul. 29, 1983

[51] Int. Cl.$^3$ ............................................. C01B 17/04
[52] U.S. Cl. .................................. 423/574 R; 423/576
[58] Field of Search ............... 423/574 G, 574 R, 576; 422/115, 171, 190

[56] References Cited

U.S. PATENT DOCUMENTS

| Re. 28,830 | 5/1976 | Hunt, Jr. et al. | 423/574 G |
| 2,767,062 | 10/1956 | Duecker | 423/576 |
| 3,749,762 | 7/1973 | Montgomery | 423/574 G |
| 4,035,474 | 7/1977 | Kunkel et al. | 423/574 R |
| 4,180,554 | 12/1979 | Goddin, Jr. et al. | 423/574 R |
| 4,309,402 | 1/1982 | Al-Muddaris | 423/574 R |
| 4,315,904 | 2/1982 | Lell et al. | 423/574 R |

FOREIGN PATENT DOCUMENTS 938087 12/1973 Canada ........................... 423/574 R

OTHER PUBLICATIONS

"MCRC Process for Improving Claus Plant Recovery"-A. B. Coady 6-9-1976: Presented to Canadian Natural Gas Processors Assoc.
"Maxisulf-A Process to Enhance Sulphur Recovery in Claus Plants"-R. Lell and U. Neumann, Davy McKee AG.
"The MCRC Sub-Dewpoint Sulphur Recovery Process"-R. E. Heigold and D. E. Berkeley, Delta Projects Limited.

Primary Examiner—Earl C. Thomas
Assistant Examiner—Jeffrey E. Russel

[57] ABSTRACT

A three catalytic reactor system and process is disclosed for obtaining acceptable levels of sulfur recovery from acid gas at a cost significantly less than that required for a standard four reactor cold bed adsorption (CBA) system. The system and process of the present invention utilizes two conventional Claus reactors and one cold bed adsorption (CBA) reactor in series. Four condensers are provided, one disposed before each of the catalytic reactors, and one on a process line connecting the third catalytic (CBA) reactor to the first catalytic (Claus) reactor. The system is designed to operate either in an adsorption mode or in a regeneration mode. In the adsorption mode, the system is similar to a standard CBA system except that the present invention incorporates only one CBA reactor while a standard CBA system incorporates two CBA reactors. In the regeneration mode, however, the CBA reactor of the present invention is operated in the same manner as the first Claus reactor in adsorption mode. Heated gas downstream of the thermal reactor is used to regenerate the CBA reactor. The effluent from the regenerated CBA reactor is directed through a heater and then to the first Claus reactor.

11 Claims, 4 Drawing Figures

SYSTEM AND PROCESS FOR PRODUCING ELEMENTAL SULFUR

BACKGROUND OF THE INVENTION

This invention relates to processes and systems for producing elemental sulfur. In particular, it relates to recovering elemental sulfur from acid gas using an extension of the modified Claus process.

The modified Claus process is widely used by the industry for the production of elemental sulfur. The process is designed to carry out the Claus reaction:

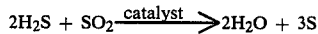

$$2H_2S + SO_2 \xrightarrow{catalyst} 2H_2O + 3S$$

The reaction is favored by low temperature and by removal of elemental sulfur vapor.

In the conventional modified Claus process, the operating conditions of the reactors in which the Claus reaction is carried out are selected to maintain elemental sulfur in the vapor state. Otherwise, the elemental sulfur would deposit on the catalyst and deactivate it. To assure high conversion, the reaction is carried out in a plurality of consecutive reactors. Elemental sulfur is condensed and removed from the effluent of a preceding reactor before it is passed to a subsequent reactor. The removal of sulfur allows the reactors to be maintained at progressively reduced temperatures.

Often, environmental regulations require sulfur recoveries higher than those attainable with the conventional modified Claus process. Several alternatives are available for attaining these higher recoveries. For example, the tail gas from a conventional two-catalytic reactor Claus unit can be further treated by a conventional SCOT or Beavon process. These processes attain high recoveries, often well in excess of those required by regulatory agencies; however, their capital expenditures and operating costs are quite high.

An alternative to such processes is known as the Cold Bed Adsorption (CBA) process. This process is capable of theoretical recoveries well above those attainable with a conventional modified Claus process, although slightly less than those attainable with the SCOT or Beavon process. The capital expenditure and operating costs for the CBA process are less than those for SCOT or Beavon but still high. The conventional CBA process includes a thermal reactor, two conventional catalytic reactors and two low temperature catalytic reactors, known as cold bed adsorption (CBA) reactors. The reaction in a CBA reactor is generally carried out at inlet temperatures ranging from about 250°-280° F. (121°-138° C.). These low temperatures favor the forward Claus reaction and result in continuous condensation of elemental sulfur onto the alumina catalyst. By removing this sulfur from the gas phase, Claus equilibrium is further improved. The catalyst can retain approximately half its weight in sulfur before it begins to lose activity. The sulfur condensing on the catalyst tends to deactivate it. Accordingly, a second CBA reactor is provides so that while the first CBA reactor is in the recovery mode, the second reactor is being regenerated to remove elemental sulfur and vice versa.

One of the major factors contributing to the expense of the CBA process are the reactors. The elimination of one of the reactors from the CBA process would significantly reduce both overall capital expenditures and operation costs, but would tend to lower recovery to unacceptable levels.

A number of processes have been designed in an attempt to achieve acceptable recovery at lower costs. As an example, Delta Engineering Corporation's MCRC Process uses three catalytic reactors. The first catalytic reactor operates above the dew point of sulfur throughout the process. One of the remaining two reactors is operated below the dew point of sulfur (low temperature reactor) while the other reactor is being regenerated. When the catalyst in the low temperature reactor becomes deactivated due to sulfur deposits, the inputs to the two reactors are switched so that the catalyst in the reactor which was operated at a low temperature is regenerated by the high temperature gas and the reactor with the regenerated catalyst therein is operated at a temperature below the dew point of sulfur. The reactor operating in the regeneration mode is fed with a gas stream from the heat exchanger after the first catalytic reactor. This heat exchanger must be of large area and must operate at high temperature in order to supply the necessary heat for regeneration. This is, of course, an expensive equipment item. Claus equilibrium in the reactor being regenerated is much poorer than in a conventional second position Claus reactor. As a result, large concentrations of $H_2S$ and $SO_2$ reach the subdewpoint reactor causing it to load excessively with elemental sulfur before the second position reactor can be adequately regenerated. This high loading reduces catalyst activity and allows entrainment of elemental sulfur from the CBA bed. Accordingly, a coalescer is added downstream of the CBA although even with this enhancement acceptable recoveries may still be unattainable. The coalescer also adds to the overall cost of the system and further diminishes the savings achieved by the elimination of a catalytic reactor.

Another prior art process which attempts to achieve acceptable recovery levels at a cost comparable to a conventional CBA process is the Maxisulf system of Davy McKee AG. The Maxisulf process provides two low temperature reactors, one of which operates as the low temperature reactor while the other is regenerated. The regeneration of the low temperature catalytic reactor is accomplished by forcing therethrough a stream of hot gas from an inline burner. The hot gas flows through the reactor in the opposite direction from the low temperature gas.

This process suffers from several drawbacks. First, the alternating directions of flow accelerate the degradation of the catalyst. Second, the process utilizes an extra burner and fuel gas, both of which increase the overall cost. Third, the process introduces a dangerous condition. If oxygen is present in the regeneration gas stream, it can sulfate and therefore deactivate the catalyst. This problem can be overcome by contacting the regeneration gas with $H_2S$, but such contacting would further add to the cost of the process. Fourth, the quality of the fuel gas must be carefully controlled to avoid the introduction of unburned hydrocarbons into the low temperature reactor. Otherwise, the hydrocarbon would be cracked and produce a tar, which, in turn, would coat and therefore deactivate the catalyst. Finally, the inline burner adds an additional volume of gas which must be treated and processed, and which reduces the attainable recovery level.

Thus, the prior art processes have not been entirely successful in solving the problem of reducing the overall cost of the conventional CBA process. There is therefore a long-felt and still unsatisfied need for a process and a system that would require fewer reactors than the conventional CBA process, but still achieve the high required overall recovery of sulfur without the need for a further treatment of the tail gas and without the need for additional expensive components. The present invention achieves the above-stated goal.

BRIEF DESCRIPTION OF THE INVENTION

The present invention significantly improves the efficiency and the economy of processes and systems for the production of elemental sulfur from acid gas. The process and system of the present invention achieve an acceptable average recovery of elemental sulfur from acid gas using only three catalytic reactors.

The process of the present invention is designed to operate in two modes: the adsorption mode and the regeneration mode. In the adsorption mode the process of the present invention operates in the same manner as a conventional CBA process except that the second low temperature CBA reactor is eliminated. The first two catalytic reactors operate as conventional Claus reactors, i.e., at temperatures above the sulfur dew point of the gas flowing through them. The third catalytic reactor operates at temperatures below the dew point of sulfur. When the sulfur loading in this low temperature CBA reactor exceeds an acceptable level, the process is switched to the regeneration mode. In that mode hot gas from the boiler is mixed with the gas from the first condenser and the combined gas is fed to the CBA reactor. The temperature of the combined gas is sufficiently high to effect an efficient regeneration of the catalyst but sufficiently low to prevent undue degradation of the catalyst.

The Claus reaction proceeds in the third catalytic reactor while the sulfur is being vaporized from the catalyst. The sensible heat from the hot gas causes vaporization of sulfur. In addition, the Claus reaction generates heat which further facilitates vaporization of sulfur. The vaporization of sulfur consumes heat and thereby prevents a temperature rise across the reactor which, in turn, improves the equilibrium of the Claus reaction.

The effluent from the third catalytic reactor passes through a condenser, then is reheated before being fed into the first catalytic reactor. The effluent from the first catalytic reactor is passed through an optional heat exchanger, a condenser, and is then reheated and fed into the second catalytic reactor. In the regeneration mode all three reactors are maintained above the sulfur dew point of the process gas.

The recovery of sulfur during the regeneration mode is lower than during the adsorption mode but remains at acceptable levels. Since the gas fed into the third reactor is at a high temperature, and since additional heat is generated by the Claus reaction in the third reactor, the catalyst regeneration takes a relatively short period of time, typically only about 5 to 25 percent of the total operating time. Accordingly, the overall average recovery is within acceptable levels even though only three catalytic reactors are used in the process.

DETAILD DESCRIPTION OF THE INVENTION

Figure 1:
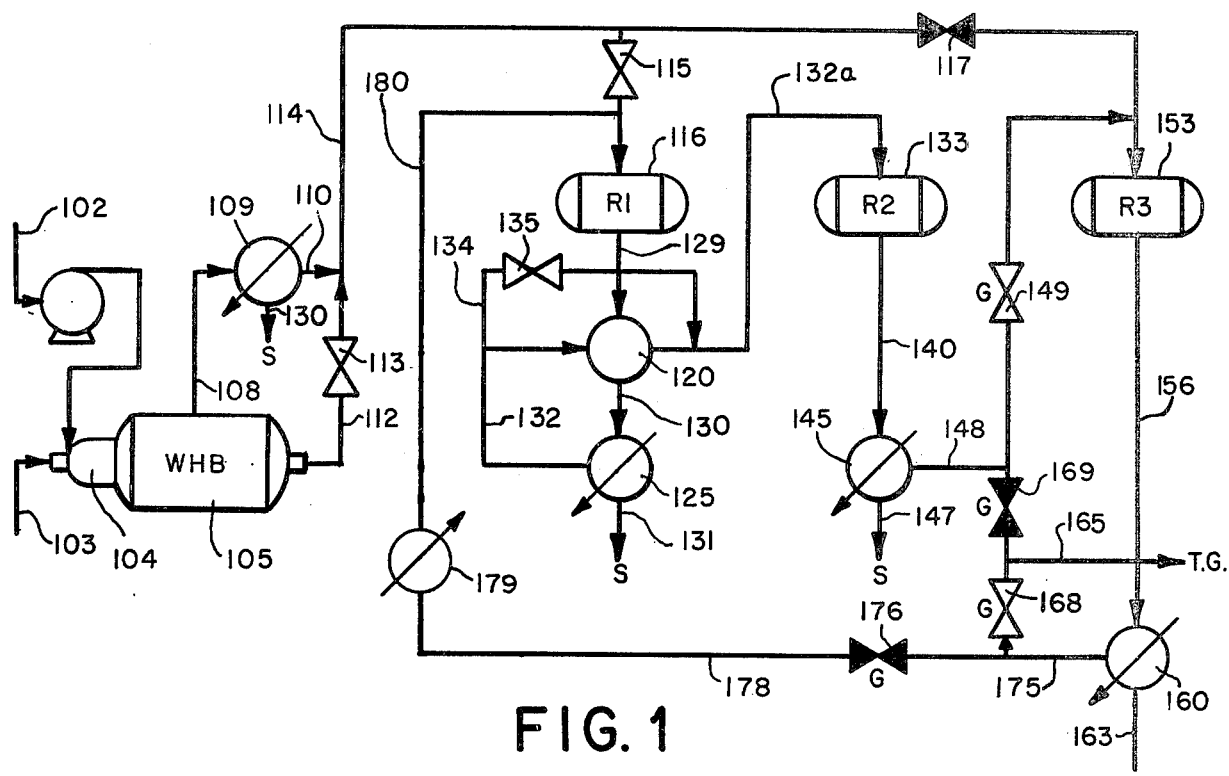
FIG. 1 is a schematic of a preferred embodiment of the process and the system of the present invention operating in the adsorption mode.

The present invention provides a process and a system for inexpensive and efficient production of elemental sulfur from an acid gas. The economy of the process over the conventional CBA system is achieved by the elimination of one of the low temperature reactors and by simplification of the valving and piping. Further, operating costs are reduced due, for example, to reduced pressure drop and consequently reduced energy requirements. The process and system of the present invention are designed to produce acceptably high recoveries without a second low temperature catalytic reactor and without adding additional expensive equipment for further treatment of the tail gas or for effecting regeneration of the catalyst.

The system of the present invention is designed to operate in two modes: the adsorption mode and the regeneration mode. In the adsorption mode, the process of the present invention is carried out in substantially the same manner as the conventional CBA process. Acid gas and air are fed into a conventional Claus thermal reactor. The effluent from the thermal reactor is cooled in a waste heat boiler then passed through a condenser to remove sulfur. The condenser effluent is reheated and fed into a first catalytic reactor which is generally operated at an inlet temperature in the range of 430°–625° F. (221°–329° C.). The inlet temperature is sufficiently high so that the process gas is maintained above its sulfur dew point throughout the reactor. The effluent from the first catalytic reactor is cooled in an optional heat exchanger and passed through a second condenser to remove additional sulfur. The gas from the second condenser is reheated, either by heat exchange or other suitable method, then fed into a second catalytic reactor. The second catalytic reactor is generally operated at an inlet temperature in the range of about 380°–450° F. (193°–232° C.). The gas in this reactor is also maintained above its sulfur dew point. The effluent from the second catalytic reactor is passed through a third condenser to remove sulfur and then fed directly into the low temperature cold bed adsorption (CBA) catalytic reactor. The low temperature catalytic reactor is operated below the sulfur dew point of the gas, generally at an inlet temperature in the range of about 250°–280° F. (121°–138° C.), which results in the condensation of elemental sulfur on the alumina catalyst. Once the elemental sulfur loading on the catalyst approaches a level at which catalyst activity becomes unacceptably low, the process is switched into the regeneration mode.

In the regeneration mode, the gases from the thermal reactor are cooled to remove sulfur then reheated to a temperature sufficiently high to efficiently regenerate the catalyst in the low temperature catalytic reactor but sufficiently low to avoid damaging the catalyst. Generally, the temperature of the regeneration gas fed into the low temperature reactor is in the range of about 430°–625° F. (221°–329° C.).

During regeneration of the low temperature reactor two phenomena take place simultaneously. First, the hot gas heats up and vaporizes the sulfur which is deposited on the alumina catalyst. Second, H₂S and SO₂ combine in the reactor to produce additional elemental sulfur. Surprisingly, the two phenomena assist each other. The vaporization consumes heat and thereby prevents a temperature rise across the reactor. This allows the reactor effluent temperature to be below that of a conventional first position catalytic reactor. The lower temperature favors the Claus reaction. Similarly, the Claus reaction generates heat which further facilitates the vaporization of sulfur.

The effluent from the low temperature catalytic reactor undergoing regeneration is cooled in a condenser and additional sulfur is recovered. The condenser effluent is then heated by heat exchange or other method and fed to the first catalytic reactor. Because the first catalytic reactor now occupies the second catalytic reactor position, it operates at a lower inlet temperature than during the adsorption mode, generally in the range of about 380°–450° F. (193°–232° C.).

The effluent from the first catalytic reactor is cooled in a condenser to recover more sulfur. The effluent from the condenser is reheated and passed into the second catalytic reactor. Because the second catalytic reactor now occupies the third catalytic reactor position, it, too, is maintained at a lower inlet temperature than during the adsorption mode, generally in the range of 360°–390° F. (180°–199° C.). The gas in this reactor is maintained above its sulfur dew point. The effluent from the second catalytic reactor is passed through a condenser to recover additional sulfur then directed to the tail gas stack (not shown).

Figure 4:
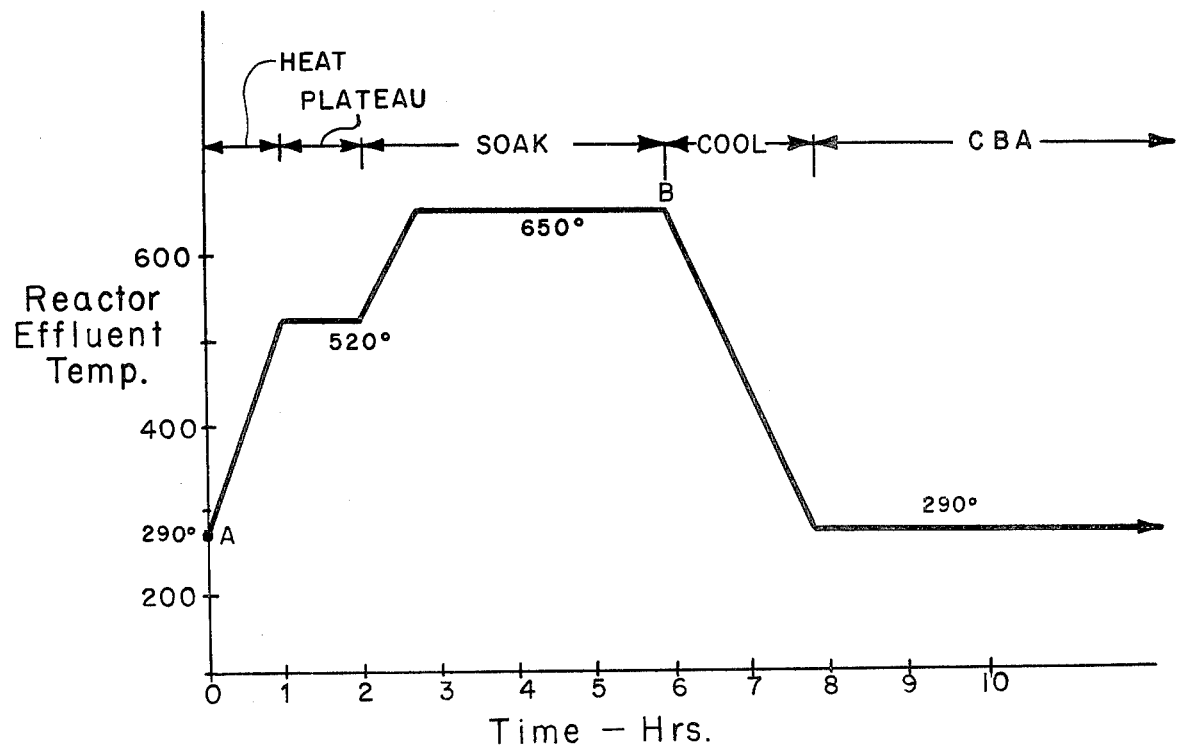
FIG. 4 depicts the temperature in a low temperature catalytic reactor, operated in the regeneration mode, as a function of time.

FIG. 4 depicts the approximate temperature profile in the low temperature reactor during regeneration. The sensible heat supplied by the regeneration gas combines with the heat generated by the Claus reaction to heat the catalyst, refractory, reactor shell, regeneration gas line and adsorbed elemental sulfur.

The plateau temperature is reached when all available sensible and generated heat is consumed as latent heat by vaporizing sulfur. The reactor effluent temperature remains at the plateau temperature until most of the adsorbed sulfur has vaporized, then continues to rise to the soak temperature. The length of the soak period is not critical and its purpose is to provide a margin of safety to insure total regeneration of the catalyst. After the soak period is completed the valves are switched back to the adsorption mode. However, approximately two hours are required for cooling the regenerated reactor back to CBA operating temperatures and conversion levels. This cooling period is considered to be part of the regeneration mode.

Figure 3:
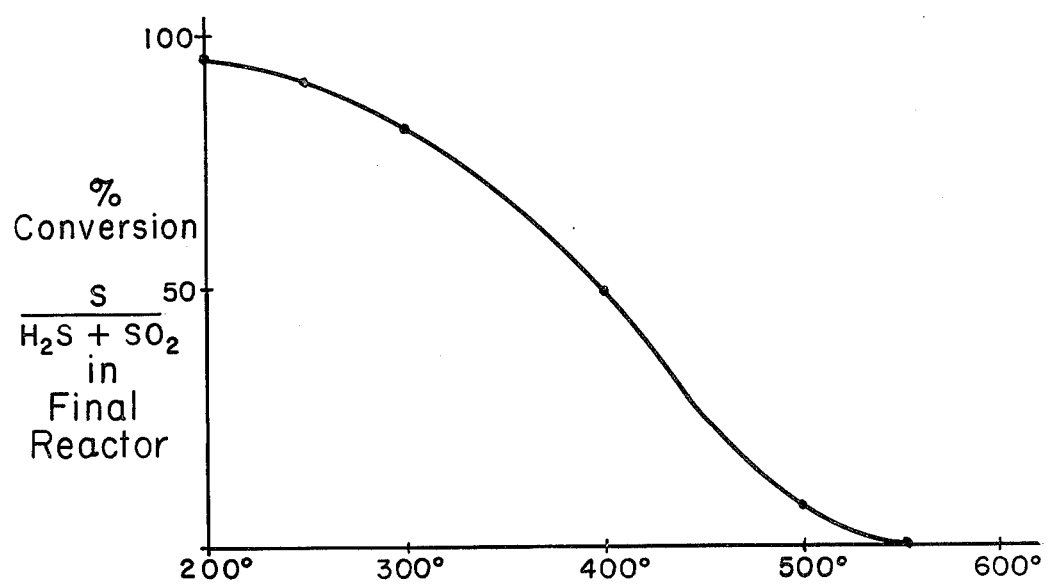
FIG. 3 depicts the approximate conversion of $H_2O$ and $SO_2$ to elemental sulfur in the final catalytic reactor as a function of temperature.

FIG. 3 depicts the approximate percent conversion of H₂S and SO₂ entering the final reactor to S as a function of temperature in degrees Fahrenheit. About 95% of the total sulfur species in the sulfur plant inlet gas is converted to elemental sulfur in the furnace and first two catalytic reactors during both the adsorption and regeneration modes. However, as seen from FIG. 3, since the final reactor effluent temperature is higher during the regeneration mode, Claus conversion in this reactor drops by about 30%. This corresponds to an overall reduction in Claus recovery during regeneration of about 1.5%. Because the system is operated in the regeneration mode only about 5–25 percent of the total operation time (depending on the length of the soak period), the reduced recoveries during regeneration lower only slightly the average recovery of sulfur for the entire operation. Furthermore, the recoveries of sulfur remain within acceptable levels throughout the operation.

The present invention will now be described in connection with the preferred embodiment depicted in the drawings.

DESCRIPTION OF THE PREFERRED EMBODIMENT OF THE PRESENT INVENTION

Figure 2:
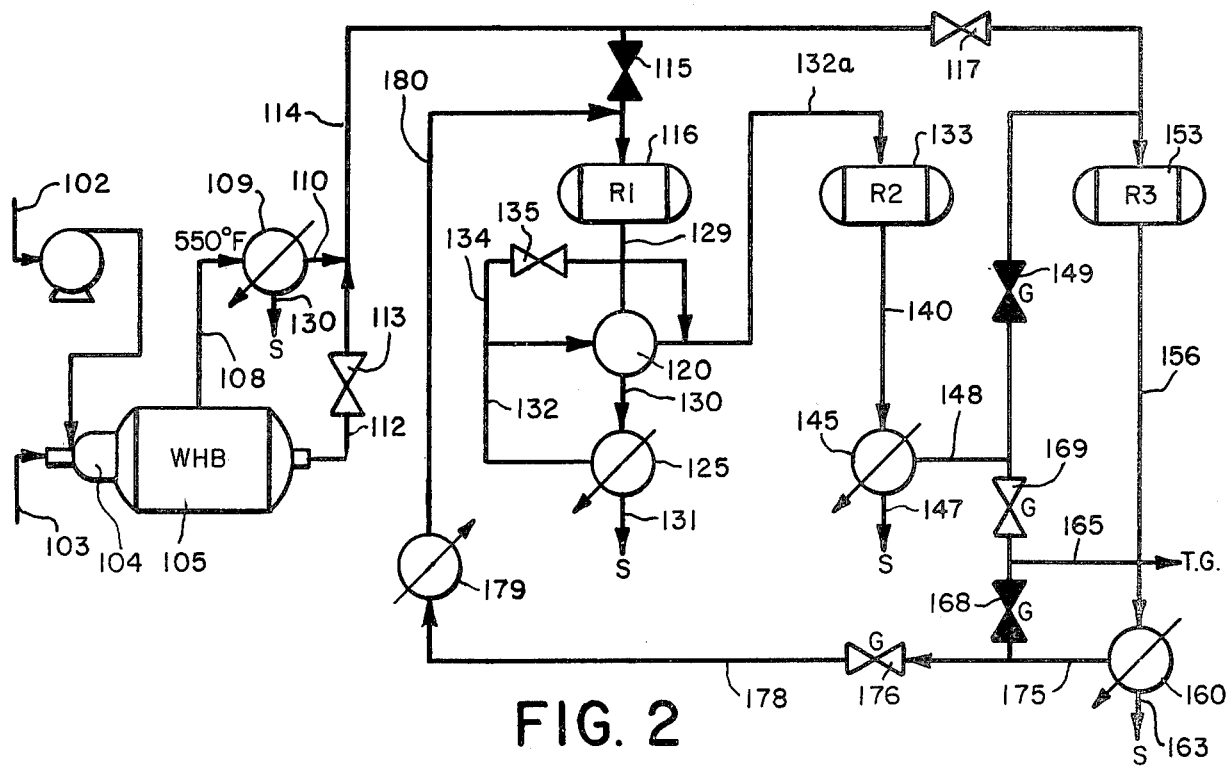
FIG. 2 is a schematic of a preferred embodiment of the process and the system of the present invention operating in the regeneration mode.

FIGS. 1 and 2 depict the preferred embodiment of the process and the system of the present invention. FIG. 1 shows the operation of the process of the present invention in the adsorption mode and FIG. 2 shows the operation of the process of the present invention in the regeneration mode. The valves which are closed and shaded in black and those which are open are not shaded. Like-numbered elements in FIG. 1 and FIG. 2 refer to identical elements. Referring now to FIG. 1, air and acid gas are fed into a thermal reactor 104 via lines 102 and 103, respectively. Effluent gases from the thermal reactor 104 are cooled in the first pass of waste heat boiler 105. The resulting gases are split. One portion is further cooled in a second boiler pass to about 550° F. (288° C.) then passed via a line 108 to a first condenser 109 which condenses sulfur vapor. The gases leave the first condenser 109 via a line 110 at about 400° F. (204° C.). The sulfur is removed from condenser 109 via a line 130 and recovered.

The second portion of the effluent from the boiler 105 is at about 1100° F. (593° C.). It is passed via a line 112 past a valve 113 and combined in a line 114 with gases leaving the first condenser 109 via the line 110. The resulting gas stream 114 is at about 550° F. (288° C.). The gas stream 114 is passed through a valve 115, to a first catalytic reactor 116 where further conversion of H₂S and SO₂ into elemental sulfur takes place. The effluent from the reactor 116 is passed through a heat exchanger 120 and a second condenser 125 via lines 129 and 130. The elemental sulfur is recovered from the condenser 125 via a line 131. The resulting gaseous stream is then passed via a line 132 through the heat exchanger 120 and via line 132a into a second catalytic reactor 133. The temperature of the gas fed into the second catalytic reactor 133 is controlled using the bypass line 134 with a valve 135. The temperature of the gas stream in line 132a (fed to the reactor 133) is generally about 400° F. (204° C.).

In the second catalytic reactor 133 further conversion of H₂S and SO₂ into elemental sulfur takes place. The effluent from the second catalytic reactor 133 is passed via a line 140 into a third condenser 145. The resulting elemental sulfur is recovered from the third condenser 145 via a line 147. The gas stream leaves the third condenser 145 at a temperature of about 260° F. (127° C.) and is passed via a line 148 past a tight sealing valve 149 (such as a Gutermuth Valve) to a third, CBA reactor 153. The sulfur produced in this reactor is adsorbed onto the catalyst bed. The effluent from the CBA reactor 153 is passed via a line 156 to a fourth condenser 160. No sulfur is removed from this condenser during this period. The gas stream exits from the fourth condenser 160 via line 175 past a tight sealing valve 168 (such as the Gutermuth Valve) via line 165 to tail gas (T.G.) stack. Tight sealing valve 169 prevents flow communication between line 165 and line 148 and tight sealing valve 176 prevents flow communication between line 175 and line 178.

The operation is the adsorption mode is continued until the catalyst in the CBA reactor 153 becomes sufficiently deactivated by sulfur deposits to bring the instantaneous recovery of sulfur below a predetermined level. Alternatively and preferably, operation in the adsorption mode can be continued until catalyst loading reaches a predetermined level below that at which instantaneous recovery begins to drop. At that point, the operation of the system is switched to the regeneration mode shown in FIG. 2.

Referring now to FIG. 2, the effluent gases from the thermal reactor 104 are cooled in the first pass of boiler 105. The resulting gases are split. One portion is further cooled in a second boiler pass to about 550° F. (288° C.) then passed via the line 108 to a first condenser 109 which condenses sulfur vapor. The gases leave the first condenser 109 via the line 110 at about 400° F. (204° C.). The sulfur is removed from the condenser 109 via the line 130 and recovered.

The second (single pass) portion of the effluent from the boiler 105 is at about 1100° F. (593° C.). It is passed via a line 112 past a valve 113 and combined in the line 114 with gases leaving the first condenser 109 via the line 110. The relative volumes of gases being combined in the line 114 are selected to produce a gas stream at a temperature of about 550° F. (288° C.). The valve 115 is closed during regeneration and a valve 117 is opened. Accordingly, the gas stream 114 flows into the CBA reactor 153. Since this stream is at about 550° F. (288° C.), it vaporizes sulfur deposited on the catalyst and therefore restores the catalyst activity. The CBA reactor 153 operates during regeneration at conditions of the first catalytic reactor. From the reactor 153 the effluent is passed via the line 156 to the condenser 160. The elemental sulfur is recovered from the condenser 160 via a line 163. The effluent from the condenser 160 is passed via a line 175 past the tight-sealing valve 176 and via a line 178 to a heater 179 and therefrom it is fed via a line 180 to the first catalytic reactor 116. The feed to the first catalytic reactor 116 is maintained at a temperature about 400° F. (204° C.).

The effluent from the first catalytic reactor 116 is passed via the line 129 to the heat exchanger 120 and therefrom via the line 130 to the condenser 125. The elemental sulfur is removed via the line 131. The effluent from the condenser 125 is passed via the line 132 to the heat exchanger 120. The bypass line 134 and the valve 135 can be used to control the temperature of the gas in the line 132a by varying the proportion of gas bypassing the heat exchanger 120. The heated gas is passed to the second catalytic reactor 133 via the line 132a at about 380° F. (193° C.).

The effluent from the second catalytic reactor 133 is passed via the line 140 to the condenser 145. The elemental sulfur is removed from the condenser 145 via the line 147. The effluent from the condenser 145 is passed via the line 148, past the tight-sealing valve 169, and the line 165 to the tail gas stack (T.G.) (not shown). Tight-sealing valve 149 prevents flow communication between line 165 and line 114 and tight sealing valve 168 prevents flow communication between line 165 and line 175.

During regeneration, the effluent of the reactor 153 follows the temperature profile depicted in FIG. 4. The effluent temperature initially rises steeply to about 520° F. (271° C.) in about one hour. The temperature then remains constant while the sulfur is being vaporized (the plateau stage in FIG. 4). Once most of the sulfur is vaporized, the temperature of the reactor effluent rises to about 650° F. (343° C.) where it reaches the soak stage (or period). The purpose of the soak period is to insure that all of the catalyst is properly regenerated. In the preferred embodiment, the soak period lasts for about 4 hours. Thereafter the valves are switched to the adsorption mode, although the system does not begin to operate in the true adsorption mode until the effluent of reactor 153 is cooled to its normal operating mode temperature of about 290° F. (143° C.). The cooling period in the preferred embodiment takes about 2 hours. The sulfur recoveries return to the high adsorption mode (designated as CBA mode in FIG. 4) levels when the cooling of the reactor 153 is completed.

The following examples are provided for illustrative purposes and are not intended to limit the claimed invention in any manner.

EXAMPLE I

The theoretical recoveries of sulfur were calculated for the process of the present invention for the following operating conditions and a 58% H$_2$S acid gas having below specified composition.

Operating Conditions

Adsorption Mode
  Feed to the first catalytic reactor at about 550° F. (288° C.).
  Feed to the second catalytic reactor at about 400° F. (205° C.).
  Feed to the third catalytic reactor at about 260° F. (127° C.).
Regeneration Mode
  Feed to the third catalytic reactor at about 550° F. (288° C.).
  Feed to the first catalytic reactor at about 400° F. (205° C.).
  Feed to the second catalytic reactor at about 380° F. (193° C.).

| Composition of Acid Gas | |
|---|---|
| Component | Lb Mols/hr |
| H$_2$S | 266.8 |
| CO$_2$ | 165.3 |
| H$_2$O | 26.6 |
| CH$_4$ | 1.0 |

The following theoretical sulfur recoveries were obtained assuming a maximum sulfur loading on the CBA reactor of 0.5 pounds per pound of catalyst:

| Period | Time (Hours) | Sulfur Recovery (Weight %) |
|---|---|---|
| Adsorption Mode | 32.1 | 99.3 |
| Regeneration Mode | | |
|   Heating | 1.0 | 96.2 |
|   Plateau | 0.6 | 97.3 |
|   Soaking | 4.0 | 97.6 |
|   Cooling | 2.0 | 97.6 |
|   Total | 39.7 | 98.9% |

This example demonstrates that when an acid gas containing 58% of H$_2$S is used, average recoveries well above 98 weight percent can be achieved using the process and the system of the present invention and that the recoveries of sulfur fall below 98% only for a short period of time.

EXAMPLE II

The theoretical recoveries of sulfur were calculated for the system operating at the conditions specified in Example I for an 80% $H_2S$ acid gas having the composition specified below.

| Composition of Acid Gas | |
|---|---|
| Component | Lb Mols/hr |
| $H_2S$ | 371.0 |
| $CO_2$ | 65.1 |
| $H_2O$ | 26.6 |
| $CH_4$ | 1.0 |

The following theoretical recoveries were obtained:

| Period | Time (Hours) | Sulfur Recovery (Weight %) |
|---|---|---|
| Adsorption Mode | 26.5 | 99.4 |
| Regeneration Mode | | |
| Heating | 1.0 | 97.0 |
| Plateau | 0.6 | 98.1 |
| Soaking | 4.0 | 98.1 |
| Cooling | 2.0 | 97.9 |
| Total | 34.1 | 99.1% |

This example demonstrates that when an acid gas containing 80% of $H_2S$ is used, the average recovery of sulfur is above 99 weight percent using the process and the system of the present invention.

Many changes and modifications will occur to those skilled in the art upon studying this disclosure. All that fall within the spirit of this invention are intended to be included within its scope as defined by the appended claims.

I claim:

1. In a Cold Bed Adsorption process of the type including in the adsorption mode the steps of reacting acid gas and air in a thermal reaction zone, reacting the resulting gas in a plurality of catalytic reaction zones arranged in series and maintained at progressively reduced temperatures, the effluent from each reaction zone being cooled to recover sulfur and the gas being then heated to a desired temperature and fed to the subsequent reaction zone, at least one of said catalytic reaction zones being at intervals operated in an adsorption mode maintained below the dew point of sulfur, the improvement comprising:

reacting the resulting gas from the thermal reaction zone in three catalytic reaction zones arranged in series for the recovery of sulfur, two of the catalytic reaction zones maintained at temperatures above the sulfur dew point, and the third catalytic reaction zone being operated in the adsorption mode at temperatures below the sulfur dew point, sulfur being deposited on the catalyst; and feeding during regeneration mode, the gas from the thermal reaction zone to the third catalytic reaction zone, maintained in the adsorption mode below the dew point of sulfur, to regenerate the catalyst and feeding the effluent therefrom through the two catalytic reaction zones maintained at temperatures above the sulfur dew point.

2. The process of claim 1 wherein the gas is fed during regeneration mode to the third catalytic reaction zone, maintained in the adsorption mode below the dew point of sulfur, at a temperature sufficiently high to regenerate the catalyst but sufficiently low to avoid damaging the catalyst.

3. The process of claim 1 wherein the gas is fed during regeneration mode to the third catalytic reaction zone, maintained in the adsorption mode below the dew point of sulfur, at a temperature in the range of about 430°–625° F. (221°–329° C.).

4. The process of claim 3 wherein during regeneration mode the effluent from the third catalytic reaction zone, maintained in the adsorption mode below the dew point of sulfur, is fed to the first catalytic reaction zone at a temperature in the range from about 380°–450° F. (193°–232° C.) and the effluent from said first catalytic reaction zone is fed to the second catalytic reaction zone at a temperature in the range from about 360°–390° F. (180°–199° C.).

5. The process of claim 4 wherein the time for regenerating the catalyst comprises from about 5 to 25 percent of total operating time.

6. An improved process for producing and recovering elemental sulfur from acid gas, said process comprising:

(a) reacting acid gas and air in a thermal reaction zone maintained at such conditions so as to facilitate the Claus reaction to produce elemental sulfur vapor;

(b) cooling the gas produced in the thermal reaction zone to condense the elemental sulfur vapor and recovering elemental sulfur therefrom; then, (c) heating the cooled gas; then, (d) reacting the heated gas, in the presence of a catalyst for facilitating the Claus reaction, in a first catalyst reaction zone to produce elemental sulfur vapor therein;

(e) cooling the gas produced in the first catalytic reaction zone to condense the elemental sulfur vapor and recovering elemental sulfur therefrom; then, (f) heating the cooled gas; then, (g) reacting the heated gas, in the presence of a catalyst for facilitating the Claus reaction, in a second catalytic reaction zone to produce elemental sulfur vapor therein;

(h) cooling the gas produced in the second catalytic reaction zone to condense the elemental sulfur vapor and recovering elemental sulfur therefrom; then, (i) reacting the cooled gas, in the presence of a catalyst for facilitating a Claus reaction to produce elemental sulfur, in a third catalytic reaction zone to produce elemental sulfur on said catalyst, said gas in step (h) being at a temperature sufficiently low to cause the reaction in the third catalytic reaction zone to proceed below the dew point of elemental sulfur;

(j) cooling the gas from the third catalytic reaction zone;

(k) discharging the gas produced in step (j);

(l) continuing steps (a) through (k), inclusive until catalyst loading reaches a predetermined level below that at which instantaneous recovery starts to fall; then (m) passing the heated gas of step (c) to the third catalytic reaction zone to vaporize sulfur on the catalyst and to regenerate said catalyst; then, (n) cooling gas from the third catalytic reaction zone to condense the elemental sulfur vapor and recovering elemental sulfur; then, (o) heating the cooled gas; then, (p) reacting the heated gas in the first catalytic reaction zone, in the presence of a catalyst for facilitating the Claus reaction, to produce elemental sulfur vapor; then, (q) cooling the gas to condense the elemental sulfur vapor and recovering elemental sulfur; then, (r) heating the cooled gas; then, (s) reacting the heated gas in the second catalytic reaction zone, in the presence of a catalyst for facilitating the Claus reaction, to produce elemental sulfur vapor;

(t) cooling the gas from the second catalytic reaction zone to condense the elemental sulfur vapor and recovering elemental sulfur; and (u) discharging the cooled gas, steps (m) through (u), inclusive, being carried out only until the catalyst in the third catalytic reaction zone is regenerated, step (l) being carried out the rest of the time.

7. Process as in claim 6 wherein step (m) comprises continuing steps (a) through (l), inclusive, until the instantaneous recovery of elemental sulfur falls below a predetermined level.

8. The process of claim 6 wherein the gas in step (b) is cooled to about 400° F. (204° C.), the gas in step (c) is heated to the temperature in the range of about 430°–625° F. (221°–329° C.), the gas in step (f) is heated to the temperature in the range of about 380°–450° F. (193°–232° C.), the cooled gas in step (i) is at an inlet temperature in the range of about 250°–280° F. (121°–138° C.), the temperature of the heated gas in step (m) is in the range of about 430°–625° F. (221°–329° C.), the temperature of the heated gas in step (o) is in the range of about 380°–450° F. (193°–232° C.), and the temperature of the heated gas in step (r) is in the range of about 360°–390° F. (180°–199° C.).

9. The process of claim 8 wherein heating in step (c) is effected by adding hot gas from said thermal reaction zone to the gas produced in step (b).

10. The process of claim 9 wherein the temperature of the heated gas in steps (f) and (r) is controlled by selecting the amount of gas to bypass the heat transfer zone.

11. The process of claim 6 wherein heating in steps (f) is effected by heat transfer in a heat transfer zone with the gas produced in step (d).

* * * * *